United States Statutory Invention Registration [19]

[11] Reg. Number: H496

Mammone et al. [43] Published: Jul. 5, 1988

[54] ELECTROLYTE FOR USE IN AN ALL INORGANIC RECHARGEABLE CELL AND LITHIUM INORGANIC CELL CONTAINING THE IMPROVED ELECTROLYTE

[75] Inventors: Robert J. Mammone, South Plainfield, N.J.; Michael Binder, Brooklyn, N.Y.

[73] Assignee: The United States of America as represented by the Secretary of the Army, Washington, D.C.

[21] Appl. No.: 84,278

[22] Filed: Aug. 10, 1987

[51] Int. Cl.[4] ..... H01M 4/58; H01M 6/24

[52] U.S. Cl. ..... 429/101; 429/196; 429/197; 252/62.2

[58] Field of Search ..... 429/101, 196, 197; 252/62.2

[56] References Cited

U.S. PATENT DOCUMENTS

| | | | |
|---|---|---|---|
| Re. 30,661 | 6/1981 | Eisenberg | 429/197 X |
| 4,375,502 | 3/1983 | Gabano | 429/197 X |
| 4,547,441 | 10/1985 | Vallin et al. | 429/197 X |

FOREIGN PATENT DOCUMENTS

| | | | |
|---|---|---|---|
| 2140146 | 3/1973 | Fed. Rep. of Germany | 429/196 |

*Primary Examiner*—John F. Terapane
*Assistant Examiner*—Eric Jorgensen
*Attorney, Agent, or Firm*—Sheldon Kanars; Jeremiah G. Murray; Roy E. Gordon

[57] ABSTRACT

An improved electrolyte is provided in a lithium/sulfur dioxide rechargeable cell, the electrolyte comprising a solution of a stable, highly conductive liquid electrolyte complex $LiAlCl_4$—$3SO_2$ and up to about 50 percent by weight of sulfuryl chloride as a cosolvent.

10 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ELECTROLYTE FOR USE IN AN ALL INORGANIC RECHARGEABLE CELL AND LITHIUM INORGANIC CELL CONTAINING THE IMPROVED ELECTROLYTE

The invention described herein may be manufactured, used, and licensed by or for the Government for governmental purposes without the payment to us of any royalty thereon.

This invention relates in general to an improved electrolyte for use in all inorganic rechargeable cell and to an all inorganic rechargeable cell including the improved electrolyte and in particular to an improved electrolyte for use in a lithium/$SO_2$ rechargeable cell and to a lithium/$SO_2$ rechargeable cell including the improved electrolyte.

BACKGROUND OF THE INVENTION

An all inorganic Li/$SO_2$ rechargeable cell generally includes a lithium anode, a porous carbon cathode and a stable highly conductive liquid electrolyte complex $LiAlCl_4$—$xSO_2$. This complex is rapidly formed when the commonly used $LiAlCl_4$ electrolyte salt reacts with $SO_2$ gas or $SO_2$ liquid. Although the initially formed liquid complex has the formula $LiAlCl_4$—$3SO_2$, additional lowered $LiAlCl_4$ salt concentration can be achieved at will by diluting the above electrolyte with additional $SO_2$. Thus, electrolyte with formulas LiAlCl—$xSO_2$ where x is at least 3 can be prepared. The starting electrolyte $LiAlCl_4$—$3SO_2$ has a very high specific conductivity of 0.1 S/cm. The fact that this is the highest known conductivity for any ambient temperature non aqueous electrolyte makes this general class of electrolytes extremely valuable.

One difficulty with the use of this electrolyte is however, that during cell discharge, the insoluble reduction product is deposited in the porous carbon cathode. Simultaneously, some of the $LiAlCl_4$ electrolyte salt is also precipitated in the porous carbon cathode. The coprecipitation of electrolyte salt is partially responsible for the severely reduced capacity currently plaguing this system.

SUMMARY OF THE INVENTION

The general object of this invention is to provide an improved lithium inorganic rechargeable cell system. A more particular object is to minimize or even eliminate $LiAlCl_4$ coprecipitation and thus improve cell capacity.

It has been found that the aforementioned objects can be attained by adding a suitable cosolvent to the electrolyte to allow excess $LiAlCl_4$ that would normally precipitate to dissolve. The requirements of an effective cosolvent are:

(A) The cosolvent should be capable of rapidly dissolving the $LiAlCl_4$ salt and, in order to minimize IR losses, must in the process form a reasonably conducting electrolyte solution.

(B) The cosolvent should be extremely miscible with liquid $SO_2$.

(C) The cosolvent must not become easily oxidized during cell charging which typically takes place at 4.0 volts relative to lithium.

(D) The cosolvent should not become chemically degraded in the presence of $AlCl_3$ or chlorine, both of which are formed during cell charging.

A particularly effective cosolvent has been found to be sulfuryl chloride, $SO_2Cl_2$. One would not expect that the addition of $SO_2Cl_2$ as a cosolvent would be able to improve cell capacity in Li/$SO_2$ rechargeable cells since the specific conductivity of pure $SO_2Cl_2$ is very poor. That is, pure $SO_2Cl_2$ is one million times less conductive than is the $LiAlCl_4$—$3SO_2$ electrolyte.

Experimental results were obtained in small laboratory cells. The cells include a lithium anode, a porous carbon cathode made from high surface area carbon black and a $LiAlCl_4$ electrolyte salt.

The following electrolytes were tested: (1) LiAlCl—$3SO_2$; (2) $LiAlCl_4$—$3SO_2$+10% $SO_2Cl_2$; (3) $LiAlCl_4$—$3SO_2$+20% $SO_2Cl_2$; and (4) $LiAlCl_4$—$SO_2Cl_2$ The results of these experiments are shown in the following Table:

| ELECTROLYTE | FIRST CYCLE CAPACITY mAH | TENTH CYCLE CAPACITY mAH |
|---|---|---|
| $LiAlCl_4$—$3SO_2$ | 9 | 14 |
| $LiAlCl_4$—$3SO_2$ + 10% $SO_2Cl_2$ | 32 | 20 |
| $LiAlCl_4$—$3SO_2$ + 20% $SO_2Cl_2$ | 52 | 18 |
| $LiAlCl_4$—$SO_2Cl_2$ | 20 | 0 |

The results clearly show that Li/$LiAlCl_4$—$3SO_2$ cells constructed with 10% and 20% added $SO_2Cl_2$ had longer capacities than either Li/$LiAlCl_4$—$3SO_2$ cells or even Li/$LiAlCl_4$—$SO_2Cl_2$ cells. It is clear that on the TENTH CYCLE, the advantage of the addition of low percentages of $SO_2Cl_2$ is evident. Cells containing more than 50% added $SO_2Cl_2$ could not be cycled ten times.

We wish it to be understood that we do not desire to be limited to the exact details as described for obvious modifications will occur to a person skilled in the art.

What is claimed is:

1. An improved electrolyte for use in an all inorganic rechargeable cell, said electrolyte comprising a solution of a stable, highly conductive liquid electrolyte complex LiAlCl—$XSO_2$ where x is at least 3, and up to about 50 percent by weight of a cosolvent that is: (a) capable of rapidly dissolving a $LiAlCl_4$ salt and in the process forming a reasonably conducting electrolyte solution; (b) extremely miscible with liquid $SO_2$; (c) not easily oxidized during cell charging; and (d) not chemically degraded in the presence of reaction products formed during cell charging.

2. An improved electrolyte according to claim 1 wherein the cosolvent is sulfuryl chloride.

3. An improved electrolyte for use in a lithium/sulfur dioxide rechargeable cell, said electrolyte comprising a solution of a stable, highly conductive liquid electrolyte complex LiAlCl—$xSO_2$, where x is at least 3, and up to about 50 percent by weight of a cosolvent that is:

(a) capable of rapidly dissolving $LiAlCl_4$ salt and in the process forming a reasonably conducting electrolyte solution;

(b) extremly miscible with liquid $SO_2$; (c) not easily oxidized during cell charging which takes place at about 4.0 volts relative to lithium; and (d) not chemically degraded in the presence of $AlCl_3$ or $Cl_2$, both of which are formed during cell charging.

4. An improved electrolyte according to claim 3 wherein the liquid complex has the formula $LiAlCl_4$—$3SO_2$.

5. An improved electrolyte according to claim 4 wherein the cosolvent is from about 10 percent to about 20 percent by weight of the electrolyte of sulfuryl chloride.

6. An improved electrolyte according to claim 3 wherein the cosolvent is sulfuryl chloride.

7. A lithium inorganic rechargeable electrochemical cell comprising lithium as the anode, a porous carbon as the cathode, and a solution of a stable, highly conductive liquid electrolyte complex $LiAlCl_4$—$xSO_2$ awhere x is at least 3, and up to about 50 percent by weight of a cosolvent that is: (A) capable of readily dissolving $LiAlCl_4$ salt and in the process forming a reasonably conducting electrolyte solution; (B) extremely miscible with liquid $SO_2$; (C) not easily oxidized during cell charging which takes place at about 4.0 volts relative to lithium; and (D) not chemically degraded in the presence of $AlCl_3$ or $Cl_2$, both of which are formed during cell charging; as the electrolyte.

8. A lithium inorganic rechargeable electrochemical cell according to claim 7 wherein the liquid complex has the formula $LiAlCl$—$3SO_2$.

9. A lithium inorganic rechargeable electrochemical cell according to claim 8 wherein the cosolvent is from about 10 percent to about 20 percent by weight of the electrolyte of sulfuryl chloride.

10. A lithium inorganic rechargeable electrochemical cell according to claim 7 wherein the cosolvent is sulfuryl chloride.

* * * * *